Figure 1:
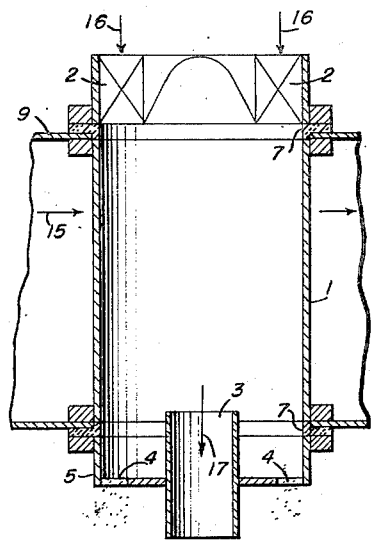

Jan. 7, 1958     R. KEMMETMÜLLER     2,818,935
COMBINED CENTRIFUGAL SEPARATOR AND HEAT EXCHANGER
Filed Oct. 26, 1954     2 Sheets-Sheet 1

INVENTOR
ROLAND KEMMETMÜLLER

ATTORNEYS

United States Patent Office 2,818,935
Patented Jan. 7, 1958

2,818,935

COMBINED CENTRIFUGAL SEPARATOR AND HEAT EXCHANGER

Roland Kemmetmüller, Vienna, Austria, assignor to Waagner-Biró Aktiengesellschaft, Vienna, Austria, an Austrian firm Application October 26, 1954, Serial No. 464,761

Claims priority, application Austria November 11, 1953

6 Claims. (Cl. 183—32)

The invention relates to a combined centrifugal separator and heat exchanger, in which the separator parts are arranged and the heat exchange media are guided in such a manner that only those separator parts are utilized for heat exchange, the function of which is not adversely affected by an incorrect operating temperature (shell of centrifugal chamber) whereas the parts which must be operated at certain temperatures (inlet guides, pure-gas pipes, dust collecting means) are disposed outside the heat exchange zones. In accordance with another feature of the invention the construction parts which would not operate properly if operated at too low a temperature, are swept only by the warm heat exchange medium (hot raw gas, pure gas or dust). Further according to the invention the separator parts used for heat exchange, particularly the shell of the whirling chamber, are heat-insulated from other parts of the centrifugal separator, such as the inlet guide, the pure-gas pipe, the dust collecting means and the like.

Some embodiments of the invention are shown by way of example in the drawing.

Figure 2:
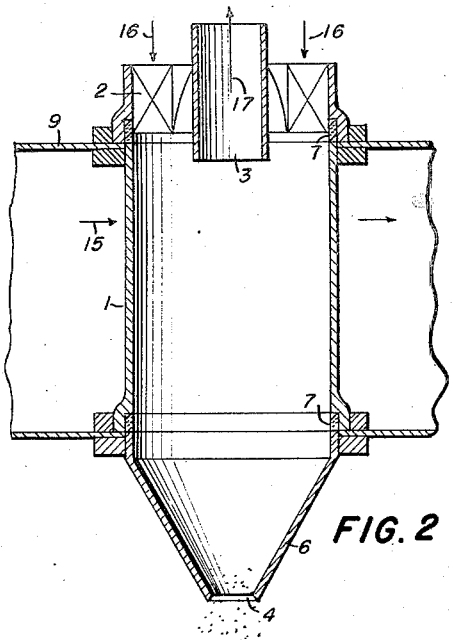
Figure 3:
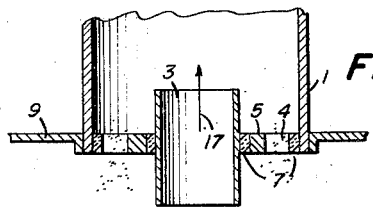
Figure 4:
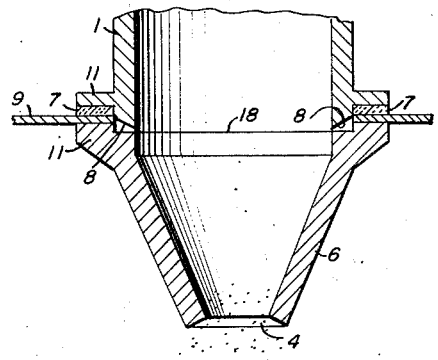
Figure 5:
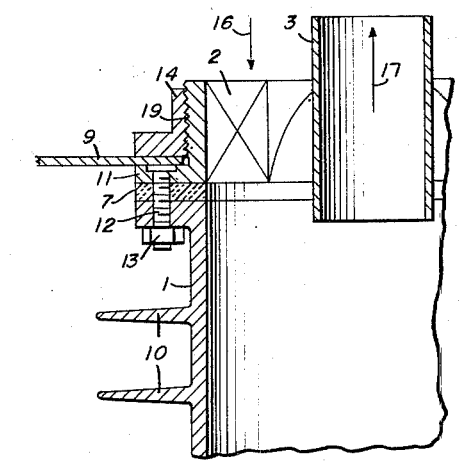
Figure 6:
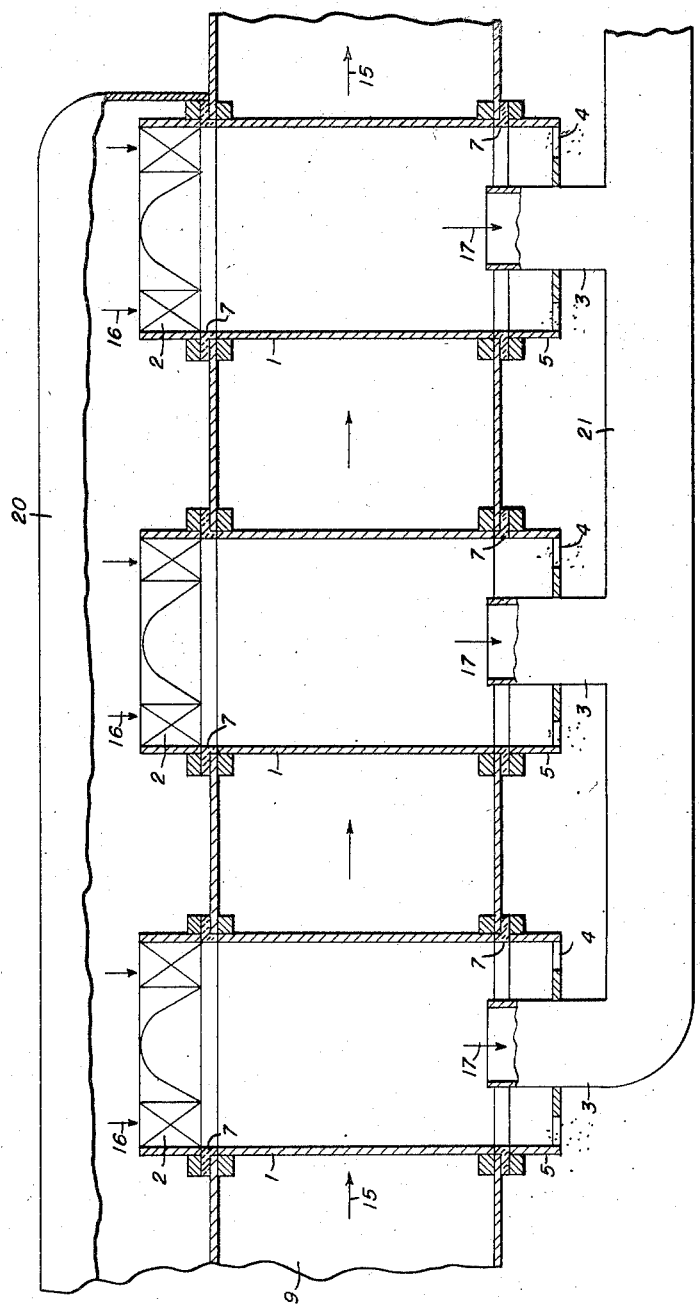

The partly diagrammatic figures illustrate central sectional views. Fig. 1 shows an axial-flow separator, Fig. 2 a reverse flow separator. In Fig. 3 the bottom of the centrifugal chamber of a cell as shown in Fig. 1 is shown in a different construction. Likewise Fig. 4 illustrates another embodiment of the reverse flow cell shown in Fig. 2. Fig. 5 shows a detail of construction of the device similar to Fig. 2. Fig. 6 shows an assemblage of several of the separator devices of Fig. 1 assembled in a system for use of the separators in parallel.

In a manner known per se hot exhaust gases, e. g., flow from a boiler plant according to arrows 16 through the inlet guides 2 into the interior of the cells. By the inlet guides the hot exhaust gases are guided along the shell 1 of the whirling chamber in a rotary flow path whereby almost the entire heat energy of these gases can be delivered to the shells 1 of the whirling chambers. When, e. g., cold air is conducted transversely across the shells 1 of the whirling chambers on the outside, in accordance with arrows 15, between boundary walls 9, that air, which can be used subsequently as air for combustion, will be preheated. After the centrifugal separation of dust et cetera from the gas the cleaned or pure gas leaves the cells through the cleaned or pure-gas pipe 3 in accordance with arrows 17. The dust passes out through openings 4 in the bottom 5 or 6 of the whirling chamber. Partitions between the pure-gas chamber and the dust chamber and between the pure-gas chamber and the raw gas chamber have not been shown because they do not form part of the invention and would only disturb the clear picture.

In the operation of such plants it has been found that certain parts of such centrifugal separators and heat exchangers are susceptible to temperature influences. These parts comprise, e. g., the inlet guides, the pure-gas pipes, and the dust collecting means. When these parts are cooled by the cold heat-exchange medium, dust may deposit on the cooled wall portions. This effect may cause restrictions of the cross section and eventually a failure of the entire plant.

To avoid that disadvantage the invention teaches the provision of gasket 7 (see Figs. 1, 2, 3, 5) at the ends of the shells 1 of the whirling chambers to insulate the sensitive parts of the separator against temperature influences. The gaskets 7 directly adjoin boundary walls 9 so that the heat exchange medium which is guided transversely against the outside of the separator shell is prevented from contacting sensitive parts of the separator along its flow path. Fig. 4 shows that air gaps 8 may be provided as well as the gaskets 7. An air gap is known to provide a particularly good heat insulation. In the construction shown in Fig. 4, rings 11 are arranged in a simple manner above and below the parting joint 18 at the shell 1 of the whirling chamber. These rings are clamped together and hold between them the boundary wall 9 and the gasket parts 7. In the illustrative embodiment shown in Fig. 5, rings 11 are provided at the inlet guide 2 and at the shell 1 of the whirling chamber. The rings 11 are clamped together by means of a bolt 12 and a nut 13. Thus the gasket 7 is clamped fast between the inlet guide 2 and the shell 1 of the whirling chamber. On the outside of the inlet guide 2 a screw thread 19 is provided, on which a clamping ring 14 for the boundary wall 9 is screwed down. The shell 1 of the whirling chamber carries transverse fins 10. In all embodiments described hereinbefore a heat exchange takes place only through the shell 1 of the whirling chamber whereas the other parts of the cell, which are susceptible to temperature influences, are insulated against such influences.

In Fig. 6 the reference numeral 1 refers to shells of separate separators, similar to that shown in Fig. 1, arranged in parallel. At 16 the hot exhaust gas flows into each of the separators from a common flue 20, and at 17 flows out into a common duct 21, while at 15 air to be heated is conducted about the outside of shells 1. It will be seen then that each separator 1 will clean that part of the flue gas that flows through it and will dissipate the heat from that part of the flue gas to the air flowing in passage 15.

The invention is not restricted to the illustrative embodiments shown. It is obvious that the transverse fins at the shell of the whirling chamber may be replaced by longitudinal fins. In that case the medium flowing on the outside is conducted in the direction of the longitudinal axis of the cells. The heat transfer may be effected in a simple manner also from the outside into the interior of the cells. When a larger number of centrifugal separators and heat exchangers of the type described are assembled in one plant, the several cells may be arranged separately or so close to each other as to form continuous walls, between which the heat exchange medium flowing on the outside is guided. Streamlined guide profiles may be provided for thus guiding the medium flowing on the outside without resistance. By a suitable arrangement of the several separator parts and/or a suitable guidance of the heat exchange media provision can be made even without special heat insulation (gasket rings, air gaps) to utilize for heat exchange only those separator parts which are insusceptible to such temperature influences. In such constructions a heat insulation may be provided additionally, if necessary.

I claim:

1. A combined heat exchanger and centrifugal separator comprising a passage for fluid to be heated, said passage being bounded by at least two opposite walls, a generally cylindrical separaton shell extending across said passage from one to the other of said walls, said separator shell being adapted to transmit heat to a relatively cold fluid in said passage from a relatively hot gas within said shell, inlet gas guides at one end of said shell for guiding flue gas into said shell, and dust collecting and discharge means at the other end of said shell, insulation means at each end of said shell adjacent said walls interposed between said shell and said inlet gas guides and between said shell and said dust collecting and discharge means, whereby the said inlet gas guides and said dust collecting means will retain heat from said relatively hot gases passing through said separator.

2. The combined heat exchanger and centrifugal separator of claim 1, in which a heat insulating gasket means provides the insulation at the ends of said separator shell.

3. The combined heat exchanger and centrifugal separator of claim 1, in which a heat insulating gasket and an insulating air space provides the insulation at the ends of said separator shell.

4. Heat exchange and separator means for preheating combustion air and removing dust from flue gas, comprising a walled passage for combustion air to be heated, at least one centrifugal dust separator for relatively hot flue gases having a cylindrical shell, said shell extending from wall to wall across said passage, said separator including a flue gas inlet guide means and a dust collecting means mounted respectively on the ends of said shell exteriorly of said passage, and heat insulating means interposed between said shell and said flue gas inlet guide means and said dust collecting means to limit heat transfer to said combustion air from said cylindrical shell.

5. The device of claim 4, in which a plurality of centrifugal dust separators are mounted in said passage, each said separator being connected to the flue supplying the flue gas in such a manner as to clean and cool the portion of the flue gas flowing therethrough.

6. A centrifugal separator and heat exchanger for separating dust from flue gases and preheating combustion air, comprising a walled air passage for said combustion air, centrifugal separator means for said flue gases, said centrifugal separator means including at least one separator shell extending vertically across said air passage, a top hot gas inlet means including inlet guides mounted on said separator shell, thermal insulating means interposed between said top hot gas inlet means and said separator shell, a bottom for said shell including at least one dust discharge opening, and heat insulating means interposed between said bottom and said separator shell whereby air passing through said passage will extract heat from said shell without cooling said top hot gas inlet means and bottom.

References Cited in the file of this patent

UNITED STATES PATENTS

| 273,688 | Kelly | Mar. 6, 1883 |
| 1,812,339 | Horne et al. | June 30, 1931 |
| 2,393,125 | St. Clair | Jan. 15, 1946 |

FOREIGN PATENTS

| 175,004 | Austria | May 26, 1953 |
| 465,897 | Great Britain | May 14, 1937 |
| 713,271 | France | Aug. 11, 1931 |